(12) United States Patent
Hasberg et al.

(10) Patent No.: US 11,004,340 B2
(45) Date of Patent: May 11, 2021

(54) METHOD FOR OPERATING A CONTROL DEVICE OF A MOTOR VEHICLE

(71) Applicant: Robert Bosch GmbH, Stuttgart (DE)

(72) Inventors: Carsten Hasberg, Ilsfeld-Auenstein (DE); Michael Helmle, Esslingen (DE); Oliver Pink, Ditzingen (DE); Sybille Eisele, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 15/543,894

(22) PCT Filed: Dec. 3, 2015

(86) PCT No.: PCT/EP2015/078462
§ 371 (c)(1),
(2) Date: Jul. 14, 2017

(87) PCT Pub. No.: WO2016/119952
PCT Pub. Date: Aug. 4, 2016

(65) Prior Publication Data
US 2018/0012496 A1    Jan. 11, 2018

(30) Foreign Application Priority Data
Jan. 26, 2015   (DE) .......................... 102015201272.7

(51) Int. Cl.
*G08G 1/16* (2006.01)
*B60Q 1/46* (2006.01)
(Continued)

(52) U.S. Cl.
CPC .............. *G08G 1/166* (2013.01); *B60Q 1/26* (2013.01); *B60Q 1/346* (2013.01); *B60Q 1/46* (2013.01);
(Continued)

(58) Field of Classification Search
CPC ............ G08G 1/166; G08G 1/096725; G08G 1/096791; G08G 1/162; G08G 1/164;
(Continued)

(56) References Cited

U.S. PATENT DOCUMENTS 8,457,827 B1 * 6/2013 Ferguson ................. G05D 1/00
                                                          701/23
9,773,410 B2 * 9/2017 Vorona ................. G08G 1/0104
(Continued)

FOREIGN PATENT DOCUMENTS

| CN | 101628568 A | 1/2010 |
|---|---|---|
| CN | 103544844 A | 1/2014 |

(Continued)

OTHER PUBLICATIONS

International Search Report dated Mar. 3, 2016, of the corresponding International Application PCT/EP2015/078462 filed Dec. 3, 2015.

*Primary Examiner* — Nicholas Kiswanto
(74) *Attorney, Agent, or Firm* — Norton Rose Fulbright US LLP; Gerard Messina

(57) ABSTRACT

A method for operating a control device of a motor vehicle driving by automation. The method includes determining a location of the motor vehicle, and acquiring driving-environment data of the motor vehicle, a control characteristic of the control device of the motor vehicle being formed in such a way that a driving behavior of at least one other road user is influenced in defined manner.

7 Claims, 4 Drawing Sheets

(51) Int. Cl.
*B60Q 5/00* (2006.01)
*B60W 30/18* (2012.01)
*B60W 30/16* (2020.01)
*B60Q 1/34* (2006.01)
*B60W 30/06* (2006.01)
*G08G 1/0967* (2006.01)
*B60Q 1/48* (2006.01)
*B60Q 1/26* (2006.01)
*B60W 40/04* (2006.01)
*B60W 50/00* (2006.01)
*G01S 13/931* (2020.01)

(52) U.S. Cl.
CPC ............... *B60Q 1/48* (2013.01); *B60Q 5/005* (2013.01); *B60W 30/06* (2013.01); *B60W 30/18009* (2013.01); *B60W 30/18036* (2013.01); *B60W 30/18163* (2013.01); *B60W 40/04* (2013.01); *G08G 1/096725* (2013.01); *G08G 1/096791* (2013.01); *G08G 1/162* (2013.01); *G08G 1/164* (2013.01); *B60W 2050/008* (2013.01); *B60W 2552/05* (2020.02); *B60W 2554/00* (2020.02); *B60W 2555/20* (2020.02); *B60W 2555/60* (2020.02); *B60W 2555/80* (2020.02); *B60W 2556/45* (2020.02); *B60W 2710/18* (2013.01); *B60W 2720/10* (2013.01); *B60W 2720/12* (2013.01); *B60W 2756/10* (2020.02); *G01S 2013/9316* (2020.01)

(58) Field of Classification Search
CPC . B60Q 1/26; B60Q 1/346; B60Q 1/46; B60Q 1/48; B60Q 5/005; B60W 30/18009; B60W 30/18036; B60W 30/18163; B60W 40/04

See application file for complete search history.

(56) References Cited

U.S. PATENT DOCUMENTS

| | | | |
|---|---|---|---|
| 2012/0143395 A1* | 6/2012 | Yamada | B60W 40/08 701/1 |
| 2012/0310465 A1* | 12/2012 | Boatright | B60Q 1/346 701/25 |
| 2013/0304365 A1* | 11/2013 | Trombley | G08G 1/09626 701/117 |
| 2014/0306834 A1* | 10/2014 | Ricci | B60Q 1/00 340/902 |
| 2014/0358841 A1* | 12/2014 | Ono | G08G 1/0112 706/52 |
| 2016/0049079 A1* | 2/2016 | Ibrahim | G08G 1/005 340/944 |

FOREIGN PATENT DOCUMENTS

| | | |
|---|---|---|
| CN | 203386369 U | 1/2014 |
| CN | 104097643 A | 10/2014 |
| DE | 10251357 A1 | 5/2004 |
| DE | 102006020631 A1 | 11/2007 |
| DE | 102011109387 A1 | 2/2013 |
| DE | 102012011994 A1 | 12/2013 |
| DE | 102013212255 A1 | 12/2014 |
| EP | 2620931 A1 | 7/2013 |
| WO | 2010010452 A1 | 1/2010 |
| WO | 2012166475 A1 | 12/2012 |

* cited by examiner

METHOD FOR OPERATING A CONTROL DEVICE OF A MOTOR VEHICLE

FIELD

The present invention relates to a method for operating a control device of a motor vehicle driving by automation. The present invention also relates to a control device for a motor vehicle drivable by automation.

BACKGROUND INFORMATION

The extent of features of driver assistance systems in today's motor vehicles is increasing constantly, and is evolving toward automated driving.

Concepts of automated operation for motor vehicles are already known in the related art. To that end, various driving-environment sensors are used to sense a driving environment of the motor vehicle. Familiar systems such as adaptive cruise control (ACC), lane-keeping assists, blind-spot detection systems, automatic emergency-braking systems and so forth are provided for realizing a semi-autonomous vehicle operation with longitudinal control, lateral guidance, etc. of the motor vehicle.

SUMMARY

An object of the present invention is to provide an improved control device for a motor vehicle driving by automation.

The objective is achieved according to a first aspect by a method for operating a control device of a motor vehicle driving by automation, having the following steps:
  determining a location of the motor vehicle;
  acquiring driving-environment data of the motor vehicle;
  a control characteristic of the control device of the motor vehicle being formed in such a way that a driving behavior of at least one other road user is influenced in defined manner.

According to a second aspect, the objective is achieved by a control device for a motor vehicle drivable by automation, data concerning a driving environment and a location of the motor vehicle being able to be provided to the control device, trajectories for the motor vehicle being determinable by the control device, and a driving behavior of at least one other road user being able to be influenced in defined manner by the control device.

A fluid driving style of a motor vehicle driving in automated fashion within a traffic situation is thereby fostered in beneficial manner. Acceptance by passengers of a motor vehicle operated in such a way as well as acceptance by other road users may thereby be influenced to advantage in positive manner.

Favorable further developments of the method and of the control device are described herein.

One favorable further development of the method provides that the driving-behavior pattern of the at least one other road user is influenced in a manner specific to the cultural area. In this way, a driving behavior of other road users may be influenced specifically, so that a traffic situation corresponds to behavior patterns specific to the cultural area.

A further advantageous development of the method provides that the driving behavior of the at least one other road user is influenced in a manner specific to the country. In this way, the control device is able to provide automated driving of the motor vehicle, oriented to regional traffic practices.

A further advantageous refinement of the method provides that a traffic situation is apprehended by the use of traffic messages.

This permits a very detailed ascertainment of a situation surrounding the motor vehicle.

Another beneficial development of the method provides that the motor vehicle is operated in fully automated or semi-automated fashion. Different automation levels of the motor vehicle are thereby facilitated with the aid of the control device.

According to a further advantageous refinement of the method, at least one of the following actions of the motor vehicle is initiated by the control device: Putting on the blinkers, braking, emitting of visual and/or acoustic warning signals. In this way, various measures and actions may be taken with the assistance of the control device, in order to selectively influence the driving behavior of other road users.

The present invention is described in detail below with further features and advantages on the basis of several figures. In this context, all described or illustrated features, alone or in any combination, form the subject of the present invention, irrespective of their combination in the claims or their antecedent, and regardless of their formulation and presentation in the specification and in the drawing, respectively. The figures are intended primarily to elucidate certain main principles of the present invention.

DETAILED DESCRIPTION OF EXAMPLE EMBODIMENTS

Figure 1:
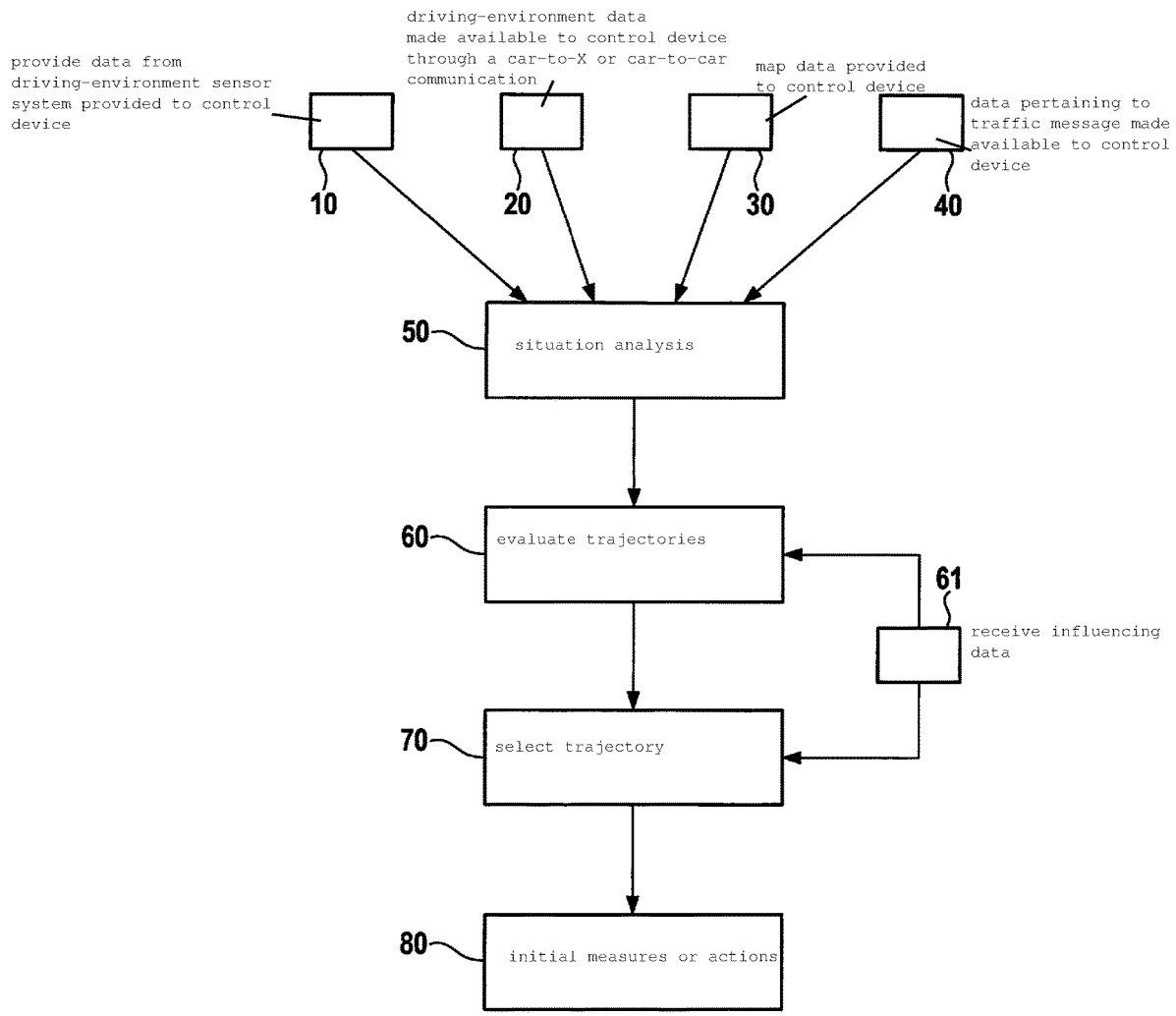
FIG. 1 shows a flow chart in principle of one specific embodiment of the method according to the present invention.

FIG. 1 shows a flow chart of one specific example embodiment of the method for operating a control device of a motor vehicle 200 driving by automation.

In a step 10, data from a driving-environment sensor system (not shown) of motor vehicle 200 is provided to control device 100.

To that end, a position of motor vehicle 200 and driving-environment data of motor vehicle 200 may be detected utilizing a sensor device (e.g., GPS sensor, radar sensor, ultrasonic sensor, lidar sensor, camera, etc.) and transmitted to control device 100. In a step 20, driving-environment data is made available to control device 100 through a car-to-X or car-to-car communication. In doing so, for example, very highly resolved map data may be downloaded from a central server device (not shown). In a step 30, map data of a navigation system is provided to control device 100. In an optional step 40, data pertaining to traffic messages is made available to control device 100. All of steps 10 to 40 therefore represent initialization steps, via which control device 100 is supplied with data in an initialization phase.

In a step 50, a situation analysis is carried out by control device 100, in doing which, a driving-environment model is generated and possible trajectories are ascertained for motor vehicle 200. In a step 60, the trajectories are evaluated by a trajectory planner.

As additional information, in a step 61, the trajectory planner receives influencing data which is intended to influence the traffic behavior of at least one or more other road users in defined fashion, e.g., in a manner specific to the country and/or cultural area. For example, the influencing data may be data pertaining to a rule requiring one to drive on the right side of the road, data regarding a typical driving style with in each case uniform
  measure of a possible obstruction of other road users,
  measure of a possible endangerment of other road users,
  and further variables
which may be taken into consideration for the selection of the trajectory to be traveled. The influencing data does not have to be formed as static parameters established in the application, but rather may include dynamic variables such as weather factors, visibility conditions, current road routings, etc.

In a step 70, the trajectory to be traveled is selected, the influencing data defined in step 61 also being utilized in the selection of the trajectory to be traveled.

Finally, in a step 80, measures or actions of motor vehicle 200 corresponding to the influencing data defined in step 61 are initiated like, for example, putting on the blinkers, braking, generating a lane offset, blowing the horn and similar measures by which other road users may be influenced in targeted fashion.

Control device 100 may take the form of a longitudinal-control device and/or a lateral-control device of motor vehicle 200, and may be implemented technically as software in one or more electronic control units of motor vehicle 200. In this way, functional diversity may be distributed in a desired manner over the individual control units and redundancies may thereby be provided. This also facilitates adaptability and updating of control device 100 in an easy manner.

In the following, a mode of operation in principle of control device 100 is explained in greater detail on the basis of several typical traffic situations.

In this context, a motor vehicle 200 driving in automated (semi-automated or fully automated) fashion is equipped with a control device 100, which realizes the method.

Figure 2:
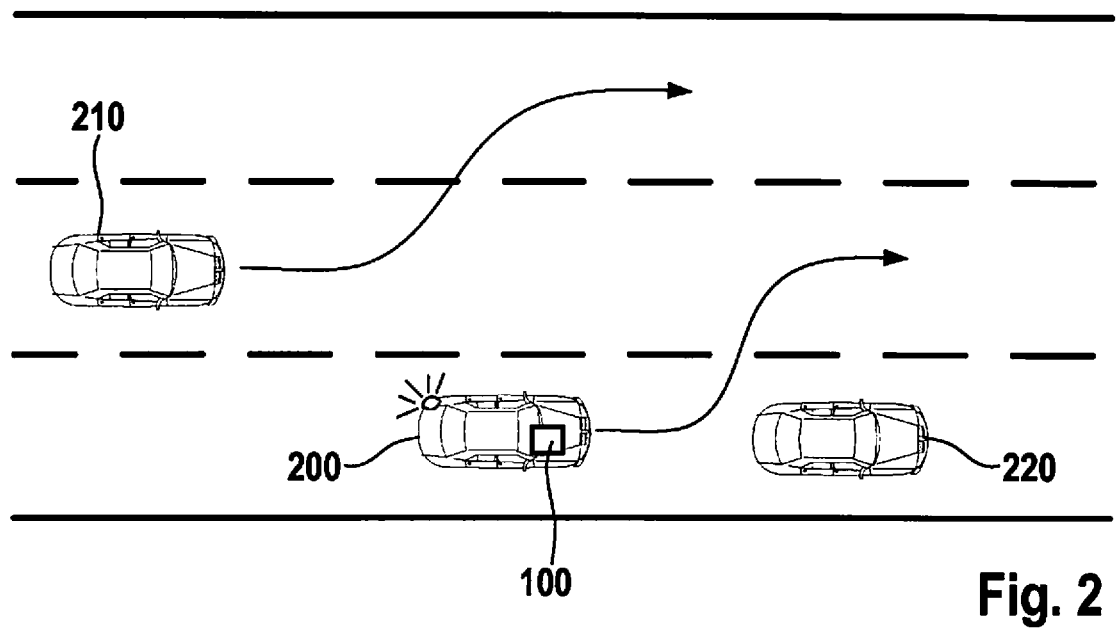
FIGS. 2 to 6 show various situations in which the control device is usable for a motor vehicle driving by automation.

FIG. 2 shows a situation in which motor vehicle 200, driving in automated fashion, would like to pass a preceding motor vehicle 220, and for this purpose, would like to change from the far right to the center traffic lane. With the assistance of a suitable sensor system (not shown) in motor vehicle 200, it is recognized that a motor vehicle 210 is approaching in the center lane from behind which, owing to the passing maneuver of motor vehicle 200, should be able to change to a left traffic lane. An instant for setting a visual blinking signal is set by control device 100 in such a way that vehicle 210 is able to leave the center lane in time and change to the free left traffic lane.

Influencing data used here includes, for instance, the typical driving style, e.g., driving defensively or driving with short vehicle-to-vehicle distances and/or tailgating. In order to increase the quality of an assessment of a driving behavior of others, it is possible to wait a defined period of time after setting the blinker, in order to observe whether the vehicle in the center lane begins to leave the lane in the direction of the left lane and/or whether the vehicle in the center lane sets its blinkers to the left. The indicated period of time may be formed as a variable established in the application (e.g., approximately 0.1 s to approximately 0.9 s) depending on the behavior specific to the country/cultural area.

Figure 3:
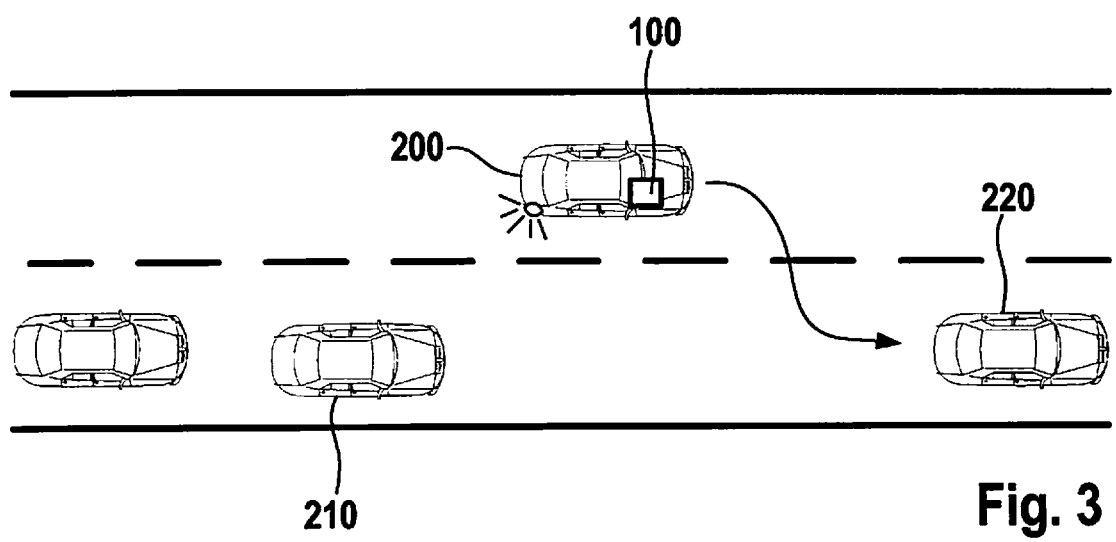

FIG. 3 shows in principle that motor vehicle 200 having control device 100 would like to change from the left lane to the right lane between motor vehicles 210, 220. For this purpose, either motor vehicle 210 may decelerate in order to let motor vehicle 100 into the gap. Alternatively, the blinker of motor vehicle 200 may also be set in such a way that motor vehicle 210 pulls up to preceding motor vehicle 220, to in this way make a space available for motor vehicle 200. This example is an example specific to a country or cultural area, since in some cultural areas, motor vehicle 210 will not open up a gap, but rather will drive even closer to the preceding vehicle. Therefore, in these cultural areas, it may be expedient to actuate the blinker as late as possible, in order to take away from motor vehicle 210, the possibility of closing the gap.

Figure 4:
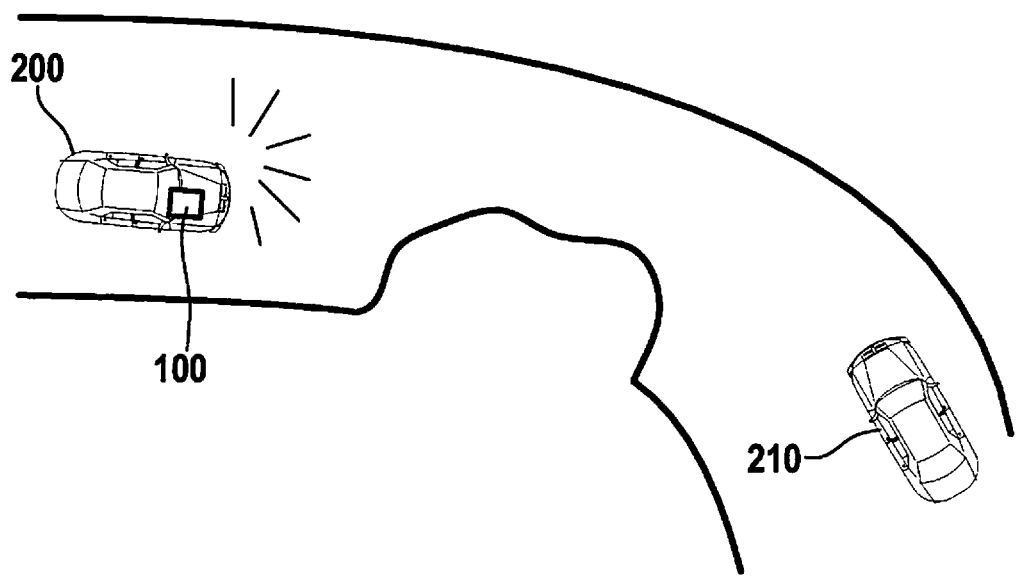

FIG. 4 shows a situation in which, at a visible bottleneck (e.g., a curve, construction site, tunnel, etc.), there is not sufficient space for simultaneous traffic in the direction of travel of the ego vehicle and from the opposite direction. In this case, with the aid of control device 100, an acoustic warning signal, e.g., in the form of a horn signal, is initiated, so that an oncoming motor vehicle 210, which is located beyond the invisible bottleneck, may be warned in timely manner.

Not shown in the figures is a situation in which motor vehicle 200, driving by automation on a country road, wants to pass a vehicle that is not driving to the far right (or in countries with left-hand traffic, is not driving to the far left). By a honking of the horn initiated by control device 100, the intention is to encourage the motor vehicle to be passed to adhere correctly to its traffic lane or, within its lane, to drive shifted slightly to the right in the case of right-hand traffic or shifted slightly to the left in the case of left-hand traffic. This example represents an example for a typically country-specific driving behavior: In Italy, such a driving behavior with honking of the horn prior to an intended passing maneuver is completely standard practice, whereas in Germany, for example, this behavior, although in compliance with traffic rules, is rather unusual. In other countries, for example, in Turkey, the announcement of the maneuver by honking the horn is even obligatory.

Figure 5:
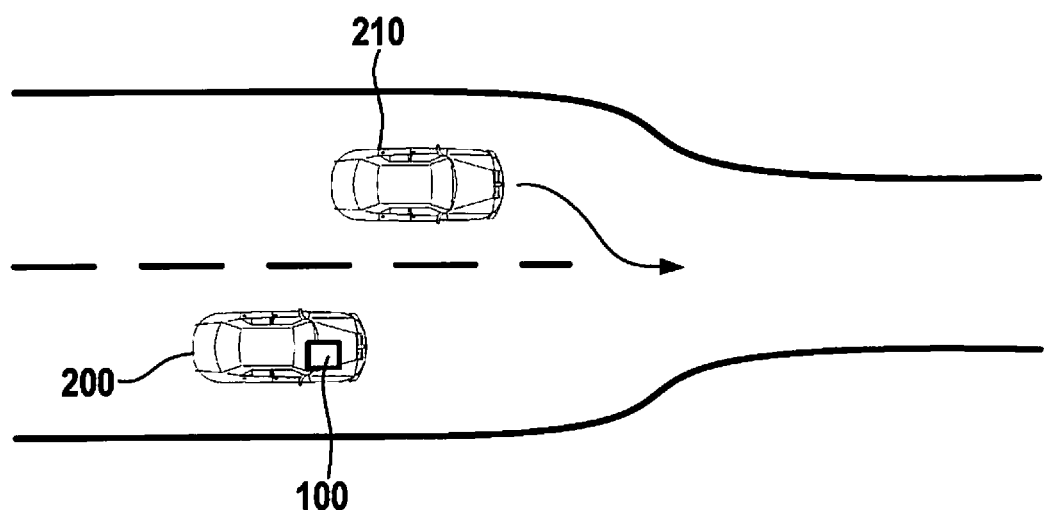

FIG. 5 shows an exemplary scenario of a "slipping-in maneuver" or "zipper process" involving at least two or more vehicles. The objective in this case is that the motor vehicles can swing in, or that one doesn't want to let them swing in. In the example shown, the roadway narrows from two lanes to a single lane. If, in the case of right-hand traffic, motor vehicle 200, driving by automation, drives to the right of the lane center, but still completely within its own track, it indicates to motor vehicle 210 that it can swing in. On the other hand, if motor vehicle 200, driving by automation, drives to the left of the lane center (not shown), it signals to motor vehicle 210 that it should swing in behind it. Thus, with the aid of control device 100, a driving behavior of motor vehicle 200 is advantageously formed in such a way that it depends on whether or not the preceding motor vehicle has swung in, so that the zipper process may be carried out.

As an alternative to the method indicated, it is also possible for motor vehicle 200, driving in automated fashion, to leave a bigger space to a preceding vehicle, in order to indicate to the other vehicle in the adjacent lane that it can swing in.

Figure 6:
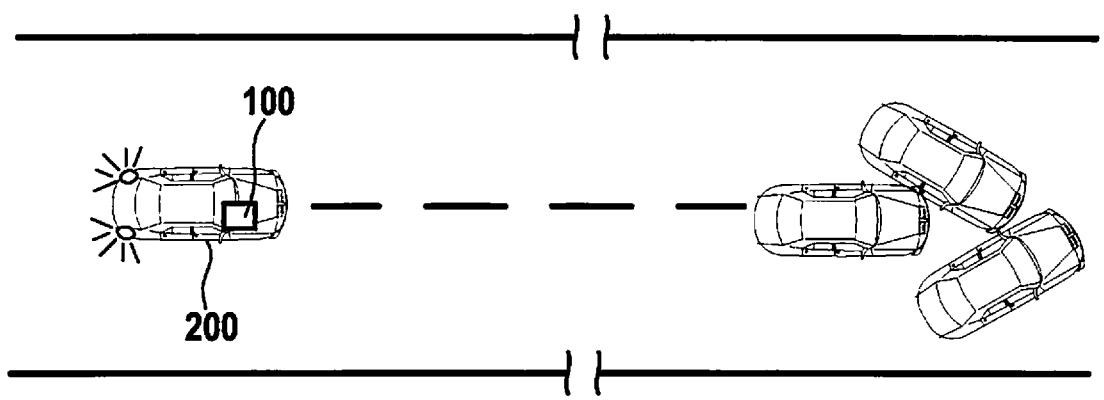

FIG. 6 shows a scenario in which road users are warned of a danger not yet visible. In this case, motor vehicle 200 driving by automation has by way of a telemetry device (cellular network, WLAN, etc., from an infrastructure, from other road users or from traffic services) or via radar (with correspondingly increased range of vision compared to that of the human eye), information to the effect that a danger not yet visible for the human eye is threatening (for example, in the form of a back of a traffic jam, blocking of a roadway due to accident, etc.). In this case, motor vehicle 200 driving in automated fashion is able to warn the following traffic by traveling outside of the lane, for example, in the center of the roadway or at least outside of the lane center, but within the lane in the direction of travel, with emergency flashers switched on by control device 100. As an alternative to the switched-on emergency flashers, in the event of a braking, the brake lights may be controlled with blinking (hazard lights). An alternative further measure is alternating flashing to the right and to the left initiated by control device 100.

A further scenario for the method for operating control device 100 is automated parking or search for a parking space (not illustrated). In this instance, in the case of a full parking facility, motor vehicle 200, driving by automation, detects one or more persons who are approaching a parked vehicle in order presumably to get in there. Motor vehicle 200 driving in automated fashion, controlled by control device 100, thereupon follows the people, stops and turns on the blinkers to indicate to other vehicles that the parking space now becoming free is claimed by motor vehicle 200 driving by automation.

A further alternative would be a signaling that, upon backing out of a parking space/parking spot, other road users were seen.

Furthermore, as a variant of the method for operating control device 100, it is possible that motor vehicle 200, driving in automated fashion, will want to back out of a parking space onto a trafficked road (not shown). Approaching vehicles are detected by a sensing system of motor vehicle 200. To now signal to the drivers of the approaching vehicles, that they were recognized, with the aid of control device 100, the reverse gear already engaged is disengaged, so that the backup light goes out. In this way, the drivers of the approaching vehicles are able to discern that they were detected. The automated exiting from the parking space is not continued again until there is no further flow of following traffic, and thus there is sufficient time for motor vehicle 200, driving in automated fashion, to pull out of the parking space by automation, and the approaching road users are no longer irritated by the backup light.

Alternatively, when pulling out of a parking spot on the right at the edge of the roadway into the flowing traffic, the blinker already set may be turned off again to indicate to the approaching traffic that motor vehicle 200, which is still parked, will wait.

As a further exemplary scenario (not shown in the figures) of an adaptation of the method for operating a control device 100 to a driving style specific to a cultural area or country by control device 100, motor vehicle 200, driving by automation, may approach an intersection with traffic lights at night. In this instance, motor vehicle 200, driving by automation, has green traffic lights, which means motor vehicle 200 would normally drive through the intersection without decelerating.

However, in some countries, e.g., in South Africa, China, etc., it cannot be assumed that other road users will always pay attention to traffic lights, which is why even when the traffic light is green, motor vehicle 200 driving in automated fashion will approach the intersection with a very defensive driving style, controlled by control device 100, in order to avoid possible collisions with crossing vehicles that do not have the right of way. Optionally, this behavior may even be necessary for certain locations within a country, for example, for certain districts within large cities in the United States, where attacks on occupants of motor vehicles that are stopped at night at a red light are to be feared. Information about where such dangerous places or districts are located may be transmitted to control device 100 via a car-to-X communication, or perhaps via the navigation.

In summary, with the present invention, a method is provided for the operation of a control device of a motor vehicle driving in automated fashion, by which the motor vehicle driving by automation is able to fit very smoothly and harmoniously into the traffic. Thus, other road users should not recognize whether or not the motor vehicle is driving by automation. Therefore, unusual driving maneuvers are not expected of other road users, by which they could be provoked to dangerous driving maneuvers. In general, acceptance of a motor vehicle driving in automated fashion and operated in this way is thus advantageously high. Consequently, a driving behavior adapted in each instance for the motor vehicle driving by automation may be provided expediently for different regional ways of behaving in road traffic, that manifest peculiarities specific to the country and/or cultural area.

One skilled in the art will alter the features of the present invention in suitable manner and/or combine them with each other, without departing from the essence of the present invention.

What is claimed is:

1. A method for operating a control device of a motor vehicle driving by automation, comprising:
   determining a location of the motor vehicle;
   acquiring driving-environment data of the motor vehicle;
   acquiring influencing data that correlates an action of the motor vehicle to be implemented in automated fashion by the control device with an expected driving behavior of at least one other road user, the driving behavior of the at least one other user depending on a traffic practice characteristic of a geographic region as indicated by the determined location of the motor vehicle;
   forming, in response to the influencing data, a control characteristic of the control device of the motor vehicle; and
   controlling an operation of the motor vehicle in accordance with the control characteristic in such a way as to present to the at least one other road user a driving behavior of the motor vehicle that is associated with the driving behavior of the at least one other road user coming into conformity with the traffic practice.

2. The method as recited in claim 1, wherein a traffic situation is apprehended with the aid of traffic messages.

3. The method as recited in claim 1, wherein the motor vehicle is operated in fully automated or semi-automated fashion.

4. The method as recited in claim 1, wherein at least one of the following actions of the motor vehicle is initiated by the control device: (i) putting on the blinkers, (ii) braking, (iii) emitting of visual warning signals, and (iv) emitting acoustic warning signals.

5. A control device for a motor vehicle drivable by automation, the control device designed to:
   determine a location of the motor vehicle;
   acquire driving-environment data of the motor vehicle;
   acquire influencing data that correlates an action of the motor vehicle to be implemented in automated fashion by the control device with an expected driving behavior of at least one other road user, the driving behavior of the at least one other user depending on a traffic practice characteristic of a geographic region as indicated by the determined location of the motor vehicle;
   form, in response to the influencing data, a control characteristic of the control device of the motor vehicle; and control an operation of the motor vehicle in accordance with the control characteristic in such a way as to present to the at least one other road user a driving behavior of the motor vehicle that is associated with the driving behavior of the at least one other road user coming into conformity with the traffic practice.

6. The control device as recited in claim 5, wherein the control device takes the form of at least one of: (i) a longitudinal-control device of the motor vehicle, and (ii) a lateral-control device of the motor vehicle.

7. A non-transitory computer-readable storage medium on which is stored a computer program for operating a control device of a motor vehicle driving by automation, the computer program, when executed by an electronic control device, causing the electronic control device to perform:

determining a location of the motor vehicle;

acquiring driving-environment data of the motor vehicle;

acquiring influencing data that correlates an action of the motor vehicle to be implemented in automated fashion by the control device with an expected driving behavior of at least one other road user, the driving behavior of the at least one other user depending on a traffic practice characteristic of a geographic region as indicated by the determined location of the motor vehicle;

forming, in response to the influencing data, a control characteristic of the control device of the motor vehicle; and controlling an operation of the motor vehicle in accordance with the control characteristic in such a way as to present to the at least one other road user a driving behavior of the motor vehicle that is associated with the driving behavior of the at least one other road user coming into conformity with the traffic practice.

\* \* \* \* \*